(12) United States Patent
Presser

(10) Patent No.: US 10,264,333 B1
(45) Date of Patent: Apr. 16, 2019

(54) METHOD AND APPARATUS FOR INTELLIGENT DUAL-TONE MULTI-FREQUENCY (DTMF) DECODING AND IDENTIFICATION

(71) Applicant: Steven Eric Presser, Peabody, MA (US)

(72) Inventor: Steven Eric Presser, Peabody, MA (US)

( * ) Notice: Subject to any disclaimer, the term of this patent is extended or adjusted under 35 U.S.C. 154(b) by 23 days.

(21) Appl. No.: 15/816,841

(22) Filed: Nov. 17, 2017

(51) Int. Cl.
*H04Q 1/46* (2006.01)
*H04M 1/57* (2006.01)
*H04Q 1/45* (2006.01)

(52) U.S. Cl.
CPC ............. *H04Q 1/46* (2013.01); *H04M 1/57* (2013.01); *H04Q 1/45* (2013.01); *H04Q 2213/13096* (2013.01)

(58) Field of Classification Search
CPC .... H04M 1/271; H04M 1/505; H04M 1/6041; H04M 1/663; H04M 2201/40; H04M 2250/74; H04M 3/323; H04M 3/36; H04M 3/487; H04M 3/493; H04M 3/51; H04M 3/523; H04M 1/64; H04M 1/654; H04M 1/66; H04M 1/82; H04M 3/14; H04M 3/4931
USPC ........ 379/32.01, 88.01, 386, 112.01, 112.06, 379/133, 135, 23, 27.02, 355.01, 357.03
See application file for complete search history.

(56) References Cited

U.S. PATENT DOCUMENTS

| | | | | |
|---|---|---|---|---|
| 5,796,809 A | * | 8/1998 | Baek ................ | H04N 1/32741 358/468 |
| 6,418,147 B1 | * | 7/2002 | Wiedeman ......... | H04B 7/18532 370/468 |
| 6,779,030 B1 | * | 8/2004 | Dugan .............. | H04M 3/42136 379/221.08 |
| 7,039,044 B1 | * | 5/2006 | Whitfield ........... | H04M 7/1295 370/356 |
| 2001/0043681 A1 | * | 11/2001 | Brablec ............. | H04M 1/64 379/80 |
| 2009/0040052 A1 | * | 2/2009 | Cameron ........... | G08B 21/0415 340/573.1 |
| 2010/0329441 A1 | * | 12/2010 | Smith ............... | H04M 3/382 379/207.11 |

* cited by examiner

*Primary Examiner* — Akelaw Teshale
(74) *Attorney, Agent, or Firm* — Edward Ryan, Esq.

(57) ABSTRACT

A dual-tone multi-frequency (DTMF) decoder may decode DTMF symbols received in an audio input and transfer the symbols to a buffer. A volume accumulator may determine whether the audio input includes audio with volume above a predetermined threshold. The buffer may receive instructions from the timer or volume accumulator to transfer stored DTMF symbols to a filter, which may identify a characteristic of information conveyed by the DTMF symbols and send the identified characteristic information to an output device. The timer may determine a time associated with when each DTMF symbol was received and transfer each associated time to the buffer, which may transfer each associated time to a group boundary detector that may determine a predetermined number of longest time durations in between the DTMF symbols. The presence of a predetermined number of longest time durations in between the DTMF symbols may indicate a telephone number format.

21 Claims, 6 Drawing Sheets

METHOD AND APPARATUS FOR INTELLIGENT DUAL-TONE MULTI-FREQUENCY (DTMF) DECODING AND IDENTIFICATION

FIELD OF INVENTION

The present invention relates to communication systems, and in particular, systems and methods for decoding and identifying dual-tone multi-frequency (DTMF) based information.

BACKGROUND

Dual-tone multi-frequency (DTMF) signaling is an in-band telecommunication signaling system using the voice-frequency band over telephone lines between telephone equipment and other communications devices and switching centers. DTMF telephone keypads provide keys that each represent a digit, symbol, or letter used to convey a telephone number or other information or data. When a user presses a key on the DTMF telephone keypad, a DTMF symbol comprising a combination of two frequencies is sent over the telephone line.

A traditional automated telephone system is implicitly aware of what information is requested (e.g., telephone number to call), the number of expected symbols (e.g., 10) and other information. Because of this foreknowledge of the structure of the audio, a traditional DTMF decoder does not need to differentiate dialed telephone routing data (e.g., a phone number) from other dialed symbols contained within telephone audio content. However, there is a need, for example, in the law enforcement context, to be able to capture only the telephone routing data without capturing the non-routing symbols or other content within the telephone audio.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

In accordance with various embodiments, the device may use information about the timing of DTMF symbols and the volume of audio between symbols in order to group DTMF symbols. After grouping the symbols, the device examines them to determine if they match the format of a phone number or other routing data. If a group of symbols is identified as a phone number or other routing data, the device outputs them via an output. The device may partition the input audio into non-overlapping sections. These sections may include: (1) DTMF symbol(s), (2) audio above a volume threshold for a long enough duration to trigger the volume accumulator of the device (i.e. voice), (3) periods of non-DTMF symbol audio of a long enough duration to trigger the timer of the device (i.e. silence), or (4) audio which does not meet the criteria of the previous categories (referred to herein as "other"). The grouping of DTMF symbols is performed by storing symbols in a buffer of the device until silence or voice is detected. Detection of silence or of voice is used to separate groups of DTMF symbols. The contents of any voice or silence sections is then discarded. "Other" audio may be discarded without having any effect because it does not meet the criteria to be voice or silence, and it is not used to separate groups of DTMF symbols.

In accordance with one embodiment, a device is configured to determine information conveyed by DTMF symbols. The apparatus may include communication circuitry configured to receive an audio input and a DTMF decoder coupled to the communication circuitry that is configured to decode each DTMF symbol included in the audio input. The DTMF decoder may be configured to transfer each DTMF symbol to a buffer to be stored. The apparatus may further include a timer coupled to the communication circuitry and the DTMF decoder that is configured to determine a time associated with when each DTMF symbol was received in the audio input and that is configured to transfer each time to the buffer to be stored. The apparatus may also include a volume accumulator coupled to the communication circuitry, the DTMF decoder, and the timer and that is configured to determine whether the audio input includes audio with volume above a predetermined threshold and that is configured to reset the timer when the audio input includes audio with volume above the predetermined threshold. The buffer may be configured to receive an instruction from the timer or the volume accumulator to transfer each stored DTMF symbol and associated time to a filter. The filter may be configured to determine information conveyed by each DTMF symbol and associated time and further configured to send the determined information to an output device.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

DETAILED DESCRIPTION OF ILLUSTRATIVE EMBODIMENTS

Described herein are methods and devices for extracting and identifying telephone numbers and other telephone routing data from unstructured telephone audio. The device may detect and decode dual-tone multi-frequency (DTMF) symbols contained within the telephone audio and may then update a recording device, such as for example a pen register or other electronic device, with the information conveyed by the DTMF symbols. This capability is useful in the law enforcement context, where law enforcement personnel and agencies may only be permitted to capture telephone routing data (i.e., they must not capture any non-routing symbols), but they do not have advance knowledge of where in a telephone call such telephone routing data is located.

Accordingly, the methods and devices described herein result in the update of recording devices in a way that complies with both the modern telephone use paradigm and modern Fourth Amendment jurisprudence related to the capture of telephone metadata.

Figure 1:
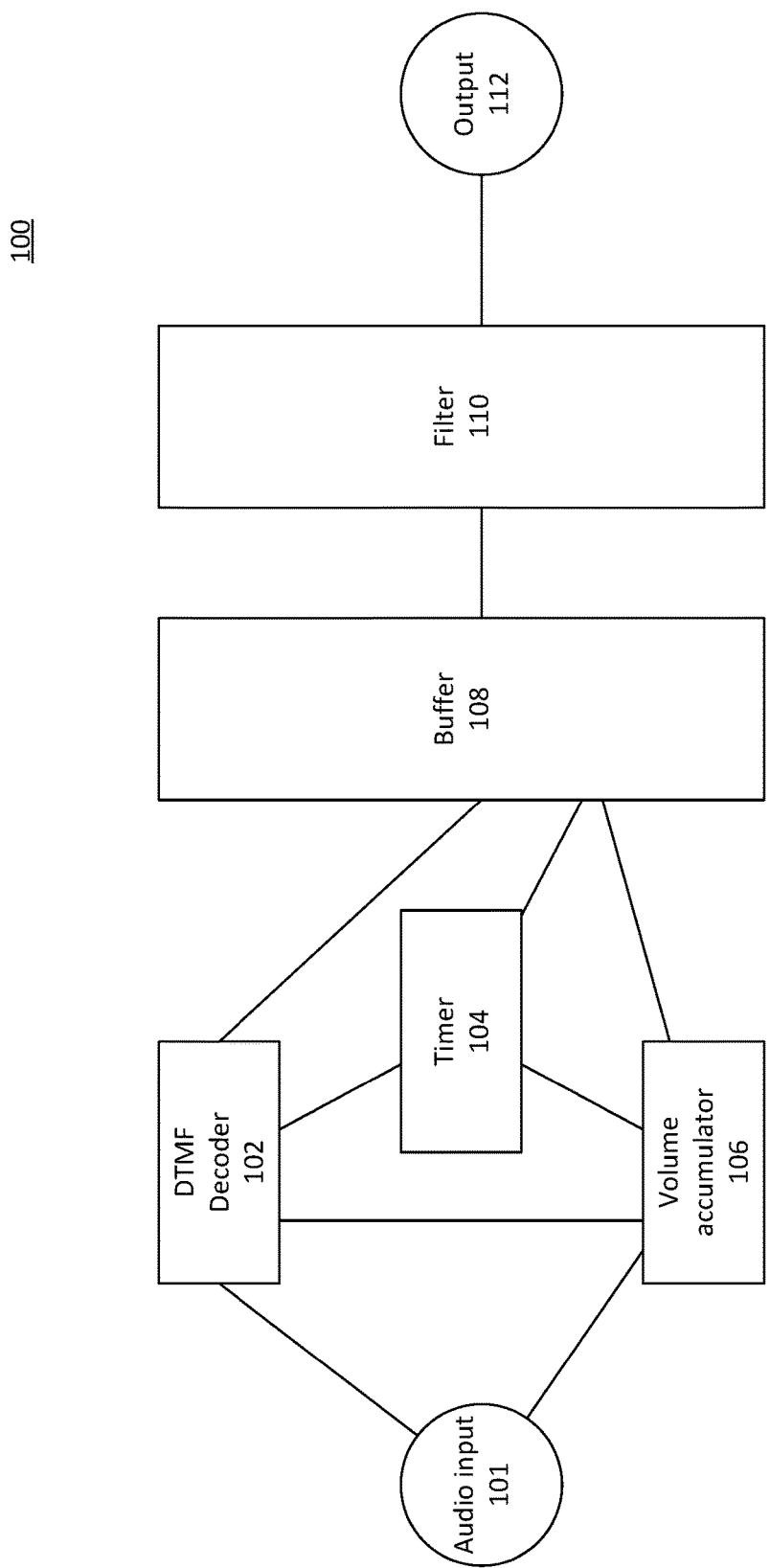
FIG. 1 is a block diagram of an implementation of the invention in accordance with one embodiment.

FIG. 1 is an example block diagram layout of the device 100 in accordance with one embodiment, which may be used in combination with any of the embodiments described herein. The device 100 may include processor(s), memory, and a receiver, transmitter, or other communication circuitry in order to connect to a network or telephone line and process and store data associated with unstructured telephone audio as described in the embodiments herein. As shown in the example of FIG. 1, the logical layout of the device 100 may include an audio input 101, an output 112, and a plurality of modules. The modules included in the example of FIG. 1 are a DTMF decoder 102, a volume accumulator 106, a timer 104, a buffer 108, and a filter 110.

The device 100 may use information about the timing of DTMF symbols and the volume of audio between symbols in order to group DTMF symbols and optionally identify the type of information being conveyed by the DTMF symbols. In a traditional DTMF decoder, this timing and volume information is discarded. After grouping the symbols, the device 100 examines them to determine, for example, if they match the format of a phone number or other routing data. If a group of symbols is a telephone number or other routing data, the device outputs them via output 112.

The device 100 may partition the input audio into non-overlapping sections. These sections may include: (1) DTMF symbol(s), (2) audio above a volume threshold for a long enough duration to trigger the volume accumulator 106 (i.e. voice), (3) periods of non-DTMF symbol audio of a long enough duration to trigger the timer 104 to expire (i.e. silence), or (4) audio which does not meet the criteria of the previous categories (referred to herein as "other"). Each section of audio is checked against these types in order and placed in one of these groups. The grouping of DTMF symbols is performed by storing symbols in the buffer 108 until silence or voice is detected. Detection of silence or of voice separates groups of DTMF symbols. The contents of any voice or silence sections is then discarded. "Other" audio may be discarded without having any effect because it does not meet the criteria to be voice or silence, and it is not used to separate groups of DTMF symbols.

The audio input 101 may provide audio via a receiver or other communication circuitry in the device 100 in a format understood by the other elements of the device 100. The DTMF decoder 102 may receive audio from the audio input 101. DTMF symbols may represent numbers 0-9, letters A-D, an asterisk (*), or an octothorpe/pound/hash sign (#). When an audio section includes a DTMF signal, the DTMF decoder 102 may detect and decode the DTMF symbols. The decoded symbols may then be transferred to the buffer 108 to enable the device 100 to output the corresponding symbol(s). The DTMF decoder 102 may reset the timer 104 and volume accumulator 106 whenever a DTMF symbol is decoded in order to ensure that that section of audio is counted only once.

The volume accumulator 106 may detect whether a non-DTMF section of audio has volume above a predetermined volume threshold (i.e., has a minimum amplitude) for a predetermined time duration. When these conditions are met, the volume accumulator 106 may determine that the non-DTMF section of audio is voice and may reset the timer 104 in order to ensure that that section of audio is counted only once. The volume accumulator 106 may send an instruction to the buffer 108 to output its contents including any stored DTMF symbol(s) because the presence of audio content with a volume above the predetermined volume threshold for the predetermined time duration in between DTMF symbol(s) may indicate the end of a potential telephone number or other telephone routing data.

The timer 104 may trigger detection of long periods of audio (e.g., silence) that do not meet the requirements that trigger the DTMF decoder 102 or volume accumulator 106. When such a period is detected because the timer 104 has not been reset by either the DTMF decoder 102 or the volume accumulator 106, the timer 104 may send an instruction to the buffer 108 to output its contents including any stored DTMF symbol(s) because the presence of silence in between DTMF symbol(s) may indicate the end of a potential telephone number or other telephone routing data.

The buffer 108 may store the symbols sent from the DTMF decoder 102 via the data bus of the device 100. When instructed by the volume accumulator 106 or timer 104 to output its contents, the buffer 108 may transfer its contents (DTMF symbol(s)) to the filter 110. After receiving a DTMF symbol(s) from the buffer 108, the filter 110 may determine whether the DTMF symbol(s) conveys information such as a valid phone number or is valid routing data.

The filter 110 may perform analysis of the DTMF symbol(s) including but not limited to a pattern match in order to determine whether the DTMF symbol(s) convey information such as a valid phone number or other valid telephone routing data. If the DTMF symbol(s) is a valid phone number or is valid telephone routing data, the filter 110 may then transfer it to the output 112. If the DTMF symbol(s) is not a valid phone number or other telephone routing data, the filter 110 may discard the DTMF symbol(s).

The output 112 may convey results in a format useful to humans or send the results to an output device. The output 112 may, for example, output to paper tape, create a record such as an electronic record for storage in memory on a computer, or send the results to an output device such as another computer or electronic device including but not limited to an electronic recording device.

Figure 2:
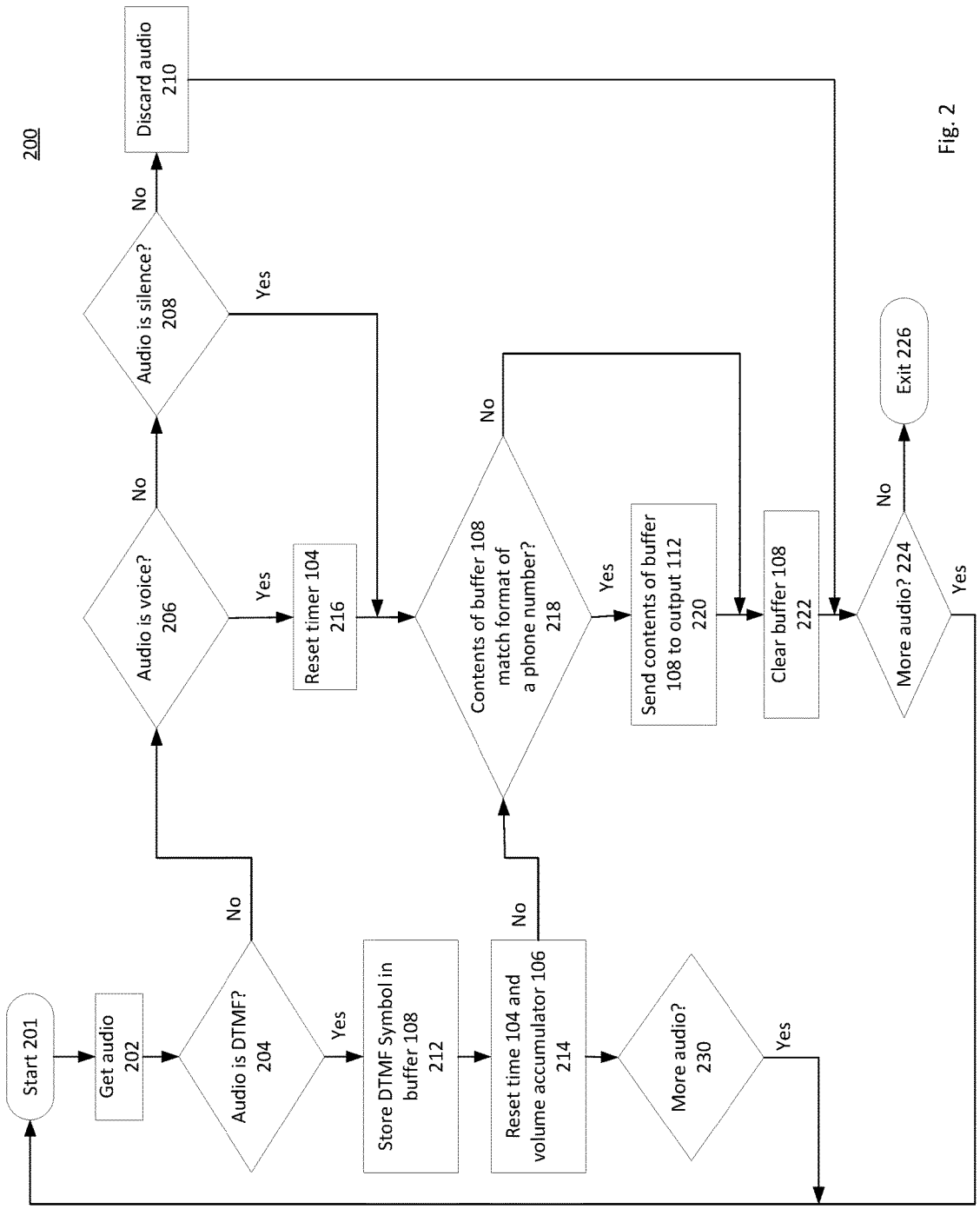
FIG. 2 is an example flow diagram of a process that may be performed by the implementation of FIG. 1.

FIG. 2 is an example flow diagram of a process 200 that may be performed by the device 100. While each step of the process 200 in FIG. 2 is shown and described separately, multiple steps may be executed in a different order than what is shown, in parallel with each other, or concurrently with each other.

The device 100 starts at step 201 and may acquire an audio input (step 202). The device 100 may then determine whether the audio includes DTMF symbols (step 204), whether the audio is voice (step 206), or whether the audio is silence (step 208). If it is determined that a section of audio includes a DTMF symbol, the device 100 may store the DTMF symbol in buffer 108 (step 212). The device 100 may then reset the timer 104 and the volume accumulator 106 (step 214) in order to ensure that that section of audio is counted only once. Whenever a DTMF symbol is present, the timer 104 is reset so that the next section of audio begins after the DTMF symbol ends. After the device 100 has stored the DTMF symbol in the buffer 108 and reset the timer 104 and the volume accumulator 106, the device 100 may then determine whether there is more audio (step 230). If the device 100 determines that there is more input audio to process, the device 100 may execute the process 200 again.

If at step 204 it is determined that the section of audio is not a DTMF symbol, the device 100 may determine whether the section of audio meets the criteria to be voice (step 206), which may indicate the end of a telephone number or other telephone routing data. To be voice, the audio must be above a predetermined volume threshold for a predetermined time duration and not contain any DTMF symbols. If a section of audio is voice, the device may reset the timer 104 (step 216) in order to ensure that the audio is counted only once. The process then continues.

If at step 206 it is determined that the section of audio is not voice, the device 100 may determine whether the audio is silence (step 208), which may indicate the end of a telephone number or other telephone routing data. To be silence, the section of audio, as determined by the timer 104, must be longer than a predetermined duration of time (resulting from the timer 104 expiring because it was not reset by the DTMF decoder 102 or the volume accumulator 106) and not contain either DTMF symbol(s) or voice as defined above. If the section of audio is not silence, the device 100 may discard the current section of audio (step 210) because it is categorized as "other" audio.

After the device 100 has determined whether the section of audio includes DTMF symbol(s), is voice, or is silence, the filter 110 of the device 100 may then examine the contents of the buffer 108 to determine whether the stored contents convey information such as the format of a telephone number or other telephone routing data (step 218). For example, this may include the filter 110 determining that the contents of the buffer 108 include ten consecutive DTMF symbols without voice or silence in between and each representing a number with the first DTMF symbol of the ten not representing a 0 or 1, which indicates a match to a domestic telephone number in the format of the United States. In another example, the filter 110 may determine that the contents of the buffer 108 match the format of an international telephone number. For example, if the contents of the buffer 108 included five consecutive DTMF symbols representing 44020 followed by eight other consecutive DTMF symbols each representing a number without voice or silence in between, the filter 110 would determine that those thirteen DTMF symbols represent a telephone number in London, United Kingdom.

If the contents of the buffer 108 do not convey information such as a valid telephone number or valid telephone routing data, the device 100 may then clear the contents of the buffer 108 (step 222). If at step 218 it is determined that the contents of the buffer 108 do match a format or characteristic of a valid telephone number or valid telephone routing data, the device 100 may send the contents of the buffer 108 to the output 112 (step 220). The device 100 may then clear the contents of the buffer 108 (step 222), which serves to reset the device 100 to begin processing a next group of DTMF symbols.

After the device 100 has determined whether the audio includes DTMF symbols (step 204), whether the audio is voice (step 206), or whether the audio is silence (step 208) and the device 100 has sent the contents of the buffer 108 to output 112 (step 220) and/or cleared buffer 108 (step 222), the device 100 may then determine whether there is more audio (step 224). If there is no more audio, the device 100 exits (step 226). If the device 100 determines that there is more input audio to process, the device 100 may execute the process 200 again (step 201).

Figure 3:
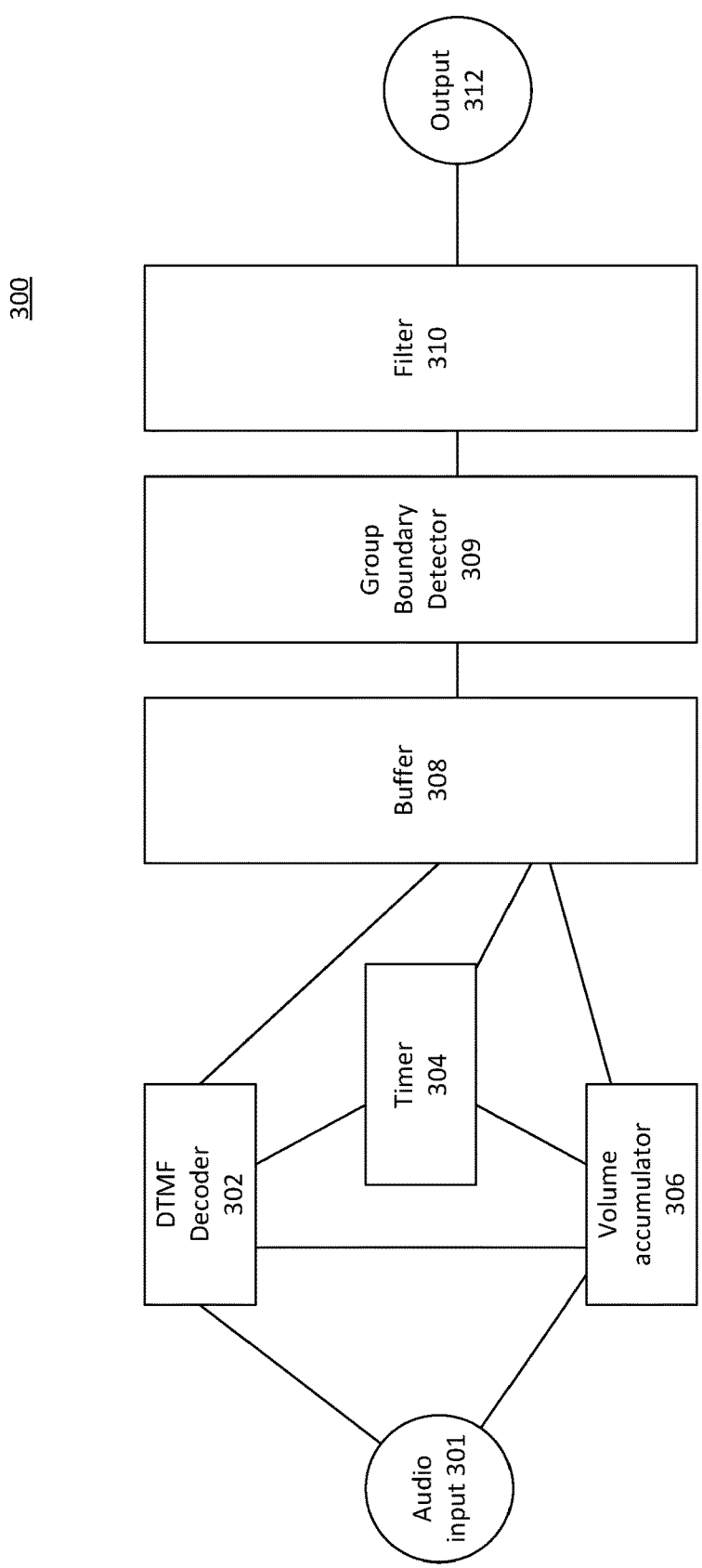
FIG. 3 is a block diagram of an implementation of the invention in accordance with another embodiment.

FIG. 3 is an example block diagram layout of device 300 in accordance with another embodiment, which may be used in combination with any of the embodiments described herein. The device 300 may include processor(s), memory, and a receiver, transmitter, or other communication circuitry in order to connect to a network or telephone line and process and store data associated with unstructured telephone audio as described in the embodiments herein. As shown in the example of FIG. 3, the logical layout of the device 300 may include an audio input 301, an output 312, and a plurality of modules. The modules included in the example of FIG. 3 are a DTMF decoder 302, a volume accumulator 306, a timer 304, a buffer 308, a group boundary detector 309, and a filter 310.

As described above in reference to device 100, the device 300 may use information about the timing of DTMF symbols and the volume of audio between symbols in order to group DTMF symbols. Studies have shown that the time period in between individual DTMF symbols is typically less than that between groups of DTMF symbols, since, for example, users pause after dialing an area code and before dialing the rest of a telephone number. As described above, after grouping the symbols, the device 300 examines them to determine if they convey information such as, for example, the format of a phone number or other routing data. The device 300 may detect groups of DTMF symbols via the group boundary detector 309, which may determine the amount of time in between DTMF symbols as stored in the buffer 308. The group boundary detector 309 may determine a predetermined number of longest time durations between DTMF symbols, which would indicate the time period between groups of DTMF symbols, as opposed to shorter time periods between individual DTMF symbols of a group. For example, grouping DTMF symbols based on a determination that there were two inter-symbol time durations that were longer than the other inter-symbol time durations may indicate a telephone number in the format XXX-XXX-XXXX indicating a domestic telephone number in the format of the United States. In another example, the group boundary detector 309 may determine a predetermined number of longest time durations between groups of DTMF symbols indicating an international telephone number format. The group boundary detector 309 may also determine DTMF symbol group boundaries based on statistics and determine a longest difference between an observed time duration and an expected time duration. For example, the group boundary detector 309 may scan the times stored and determine a user's dialing speed. The group boundary detector 309 may then determine the group boundary when an observed time duration between DTMF symbols is outside of the determined dialing speed. If a group of symbols is identified as having a format of a telephone number or other routing data, the device 300 outputs them via output 312.

The device 300 may partition the input audio into non-overlapping sections. These sections may include: (1) DTMF symbol(s), (2) audio above a volume threshold for a long enough duration to trigger the volume accumulator 306 (i.e. voice), (3) periods of non-DTMF symbol audio of a long enough duration to trigger the timer 304 to expire (i.e. silence), or (4) audio which does not meet the criteria of the previous categories (referred to herein as "other"). Each section of audio is checked against these types in order and placed in one of these groups. The grouping of DTMF symbols is performed by storing symbols in the buffer 308 until silence or voice is detected. Detection of silence or of voice separates groups of DTMF symbols. The contents of any voice or silence sections is then discarded. "Other" audio may be discarded without having any effect because it does not meet the criteria to be voice or silence, and it is not used to separate groups of DTMF symbols.

The audio input 301 may provide audio via a receiver or other communication circuitry in the device 300 in a format understood by the other elements of the device 300. The DTMF decoder 302 may receive audio from the audio input 301. DTMF symbols may represent numbers 0-9, letters A-D, an asterisk (*), or an octothorpe/pound/hash sign (#). When an audio section includes a DTMF signal, the DTMF decoder 302 may detect and decode the DTMF symbols. The decoded symbols and their associated times as determined by the timer 304 may then be transferred to the buffer 308 to enable the device 300 to output the corresponding symbol-time pairs. The DTMF decoder 302 may reset the timer 304 and volume accumulator 306 whenever a DTMF symbol is decoded in order to ensure that that section of audio is counted only once.

The volume accumulator 306 may detect whether a non-DTMF section of audio has volume above a predetermined volume threshold (i.e., has a minimum amplitude) for a predetermined time duration. When these conditions are met, the volume accumulator 306 may determine that the non-DTMF section of audio is voice and may reset the timer 304 in order to ensure that that section of audio is counted only once. The volume accumulator 306 may send an instruction to the buffer 308 to output its contents including any stored DTMF symbol(s) because the presence of audio content with a volume above the predetermined volume threshold for the predetermined time duration in between DTMF symbol(s) may indicate the end of a potential telephone number or other telephone routing data.

The timer 304 may trigger detection of long periods of audio (e.g., silence) that do not meet the requirements that trigger the DTMF decoder 302 or volume accumulator 306. When such a period is detected because the timer 304 has not been reset by either the DTMF decoder 302 or the volume accumulator 306, the timer 304 may send an instruction to the buffer 308 to output its contents including any stored DTMF symbol(s) because the presence of silence in between DTMF symbol(s) may indicate the end of a potential telephone number or other telephone routing data.

The buffer 308 may store the symbols sent from the DTMF decoder 302 via the data bus of the device 300. The buffer 308 may also store the time received from the timer 304 that is associated with each symbol received from the DTMF decoder 302. This enables the buffer 308 to store the DTMF symbols and their associated times as symbol-time pairs. When instructed by the volume accumulator 306 or timer 304 to output its contents, the buffer 308 may transfer its contents (symbol-time pairs) to the group boundary detector 309 so that the device 300 may determine a predetermined number of longest time durations between DTMF symbols and may insert group boundaries between the symbol-time pairs with the predetermined number of longest time durations.

The group boundary detector 309 may then drop the time component of the symbol-time pairs and transfer the DTMF symbol(s) with any inserted group boundaries to the filter 310. The filter 310 may determine whether the DTMF symbol(s) convey information such as a valid phone number or is valid routing data.

The filter 310 may perform analysis of the DTMF symbol(s), including but not limited to, a pattern match in order to determine whether the DTMF symbol(s) convey information such as a valid phone number or other valid telephone routing data. If the DTMF symbol(s) is a valid phone number or is valid telephone routing data, the filter 310 may then transfer it to the output 312. If the DTMF symbol(s) is not a valid phone number or other telephone routing data, the filter 310 may discard the DTMF symbol(s).

The output 312 may convey results in a format useful to humans or send the results to an output device. The output 312 may, for example, output to paper tape, create a record such as an electronic record for storage in memory on a computer, or send the results to an output device such as another computer or electronic device including but not limited to an electronic recording device.

Figure 4:
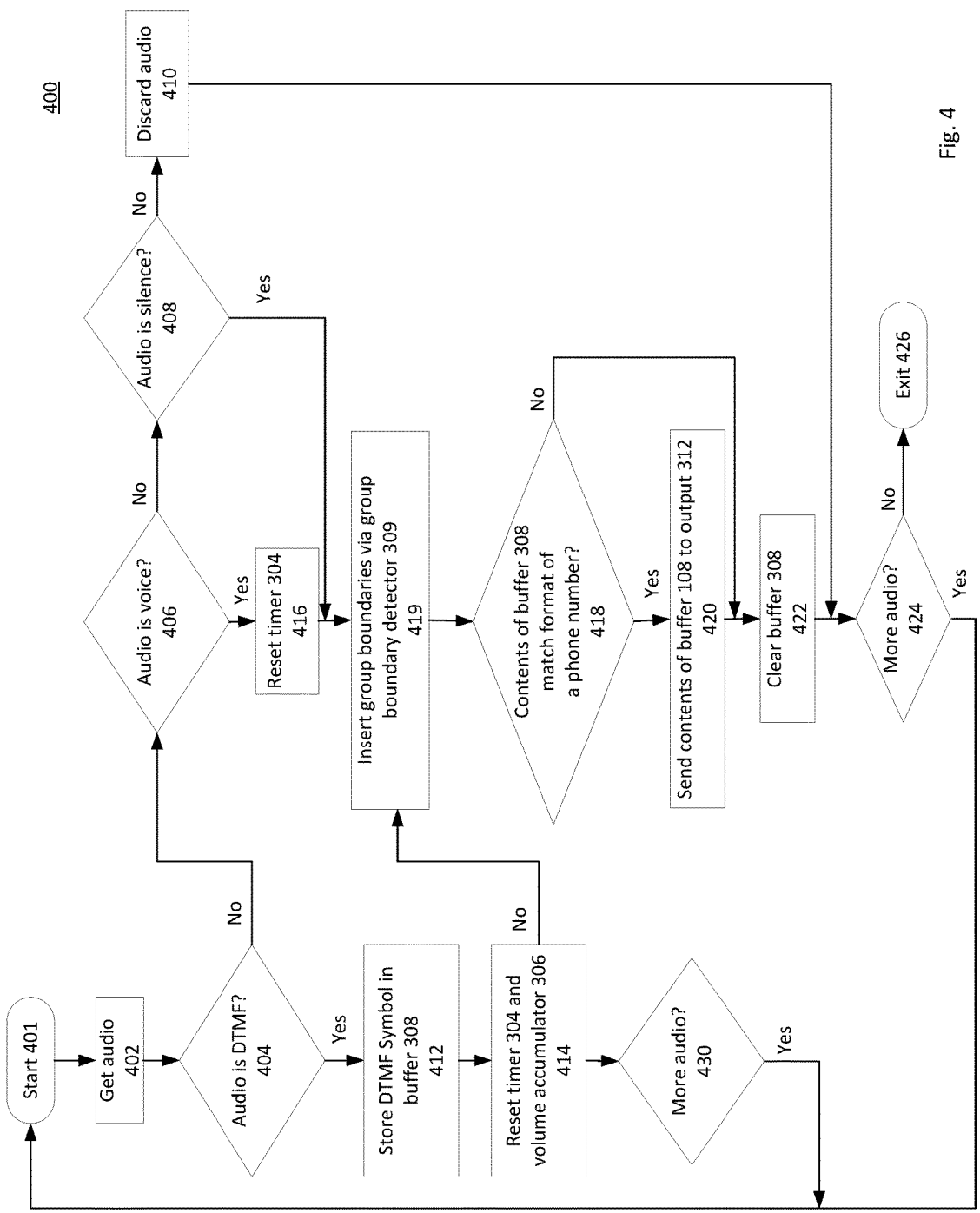
FIG. 4 is an example flow diagram of another process that may be performed by the implementation of FIG. 3.

FIG. 4 is an example flow diagram of a process 400 that may be performed by the device 300. While each step of the process 400 in FIG. 4 is shown and described separately, multiple steps may be executed in a different order than what is shown, in parallel with each other, or concurrently with each other.

The device 300 starts at step 401 and may acquire an audio input (step 402). The device 300 may then determine whether the audio includes DTMF symbols (step 404), whether the audio is voice (step 406), or whether the audio is silence (step 408). If it is determined that a section of audio includes a DTMF symbol, the device 300 may store the DTMF symbol in buffer 308 (step 412). The device 300 may then reset the timer 304 and the volume accumulator 306 (step 414) in order to ensure that that section of audio is counted only once. Whenever a DTMF symbol is present, the timer 304 is reset so that the next section of audio begins after the DTMF symbol ends. After the device 300 has stored the DTMF symbol in the buffer 308 and reset the timer 304 and the volume accumulator 306, the device 300 may then determine whether there is more audio (step 430). If the device 300 determines that there is more input audio to process, the device 300 may execute the process 400 again.

If at step 404 it is determined that the section of audio is not a DTMF symbol, the device 300 may determine whether the section of audio meets the criteria to be voice (step 406), which may indicate the end of a telephone number or other telephone routing data. To be voice, the audio must be above a predetermined volume threshold for a predetermined time duration and not contain any DTMF symbols. If a section of audio is voice, the device may reset the timer 304 (step 416) in order to ensure that the audio is counted only once. The process then continues.

If at step 406 it is determined that the section of audio is not voice, the device 300 may determine whether the audio is silence (step 408), which may indicate the end of a telephone number or other telephone routing data. To be silence, the section of audio, as determined by the timer 304, must be longer than a predetermined duration of time (resulting from the timer 304 expiring because it was not reset by the DTMF decoder 302 or the volume accumulator 306) and not contain either DTMF symbol(s) or voice as defined above. If the section of audio is not silence, the device 300 may discard the current section of audio (step 410) because it is categorized as "other" audio.

After the device 300 has determined whether the section of audio includes DTMF symbol(s), is voice, or is silence, the device 300 may insert group boundaries via the group boundary detector 309 (step 419). The filter 310 of the device 300 may then examine the contents of the buffer 308 to determine whether the stored contents convey information such as the format of a telephone number or other telephone routing data (step 418). If the contents of the buffer 308 do not match a valid telephone number or valid telephone routing data, the device 300 may then clear the contents of the buffer 308 (step 422).

If at step 418 it is determined that the contents of the buffer 308 do match a valid telephone number or valid telephone routing data, the device 300 may send the contents of the buffer 308 to the output 312 (step 420). The device 300 may then clear the contents of the buffer 308 (step 422), which serves to reset the device 300 to begin processing a next group of DTMF symbols.

After the device 300 has determined whether the audio includes DTMF symbols (step 404), whether the audio is voice (step 406), or whether the audio is silence (step 408) and the device 300 has sent the contents of the buffer 308 to output 312 (step 420) and/or cleared buffer 308 (step 422), the device 300 may then determine whether there is more audio (step 424). If there is no more audio, the device 300 exits (step 426). If the device 300 determines that there is more input audio to process, the device 300 may execute the process 400 again (step 401).

Figure 5:
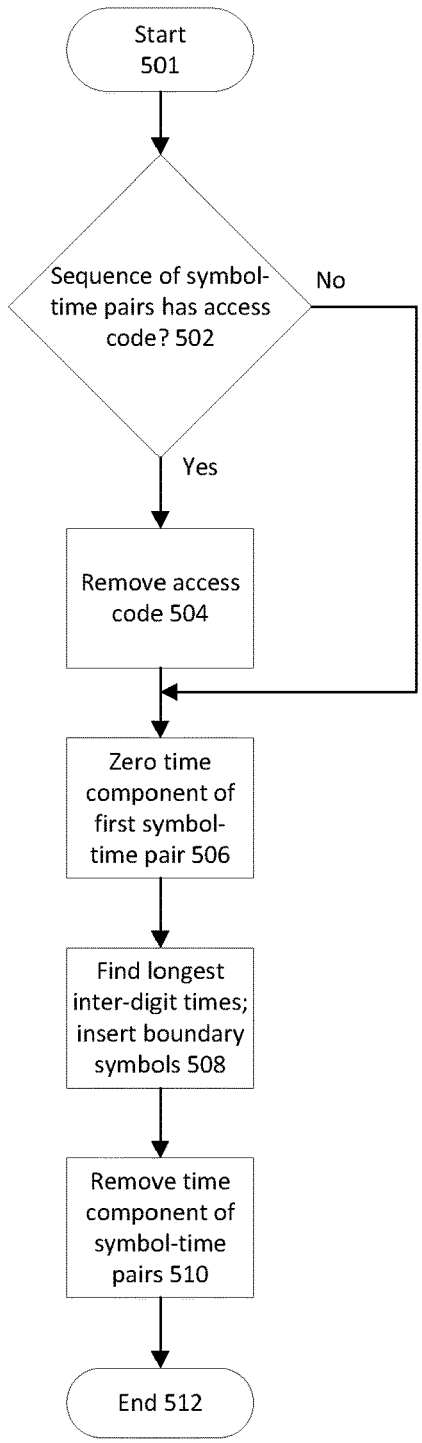
FIG. 5 is an example flow diagram of a process that may be performed by the group boundary detector of the implementation of FIG. 3.

FIG. 5 is an example flow diagram of a process 500 that may be performed by the group boundary detector 309 of the device 300. While each step of the process 500 in FIG. 5 is shown and described separately, multiple steps may be executed in a different order than what is shown, in parallel with each other, or concurrently with each other. The group boundary detector 309 starts (step 501) and then determines whether a sequence of symbol-time pairs (as received from the buffer 308) has an access code (step 502). An access code is a sequence of DTMF symbols dialed in order to access specific functionality in the telephone network. For example, in the United States, users are often required to dial 1 before the telephone number in order to access long distance dialing or to dial 011 for international dialing. If the sequence of symbol-time pairs has an access code, the group boundary detector 309 may remove the access code (step 504). After removing the access code or if the symbol-time pairs does not have an access code, the group boundary detector 309 may zero the time component of the first symbol-time pair (step 506). The group boundary detector 309 may then determine the longest inter-digit times and insert boundary symbols during those times (step 508). The group boundary detector 309 may then remove the time component of the symbol-time pairs (step 510) and end (step 512) the process 500.

Figure 6:
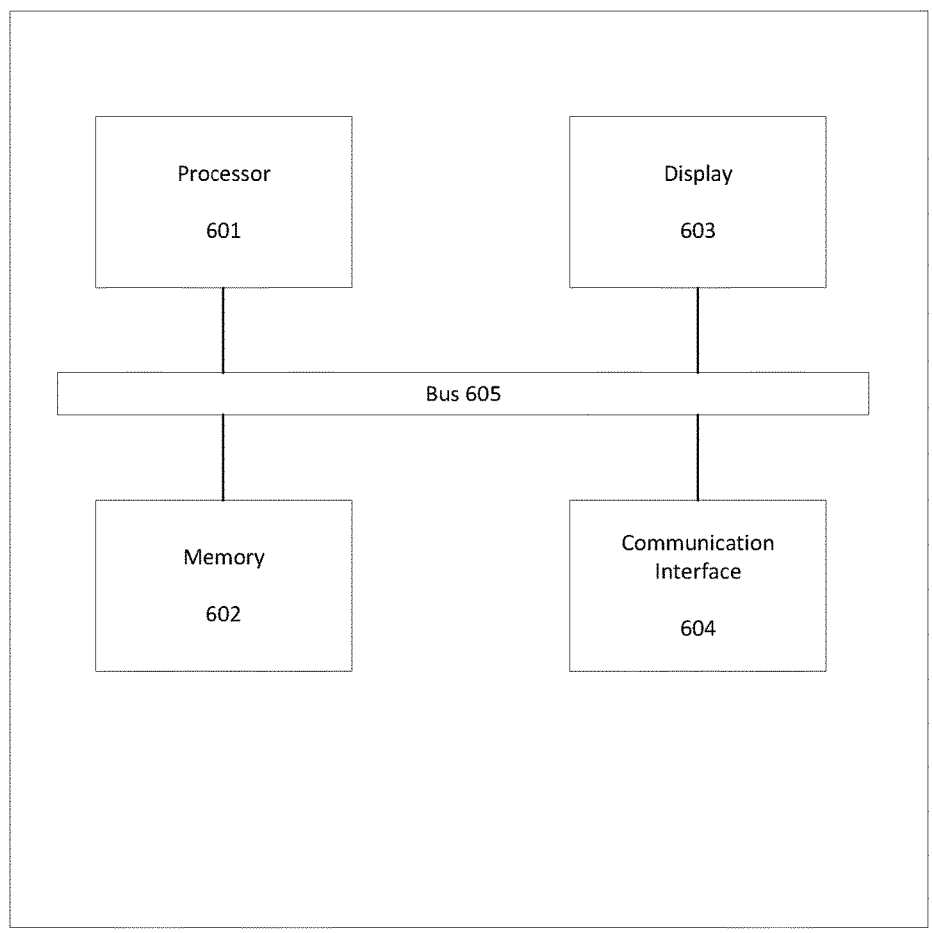
FIG. 6 is a block diagram of an example device that may implement any of the embodiments described herein.

FIG. 6 is a block diagram of an example device 600 that may implement any of the embodiments described herein. The device 600 may include a processor 601, a memory 602, a display 603, and a communication interface 604 which may include a receiver, transmitter, or transceiver that is capable of communicating in a wired or wireless network, and which all may be in communication with one another and with any other associated components of the device 600 using any suitable type of communication such as via a bus 605. The memory 602 may be any computer-readable medium or suitable device for electronic data storage. The processor 601 may be a programmed processor capable of executing computer-executable instructions that may be stored in memory 602 causing the device 600 to perform any of the methods described herein.

Having thus described the various embodiments, it is to be appreciated and will be apparent to those skilled in the art that the present embodiments are to be considered in all respects as illustrative and not restrictive. Although features and elements are described above in particular combinations, it is to be appreciated that each feature or element can be used alone or in any combination or sub-combination with or without the other features and elements. Any single embodiment described herein may be supplemented with one or more elements from any one or more of the other embodiments described herein. Any single element of an embodiment may be replaced with one or more elements from any one or more of the other embodiments described herein.

What is claimed:

1. An apparatus configured to identify a characteristic of information conveyed by dual-tone multi-frequency (DTMF) symbols, the apparatus comprising:
communication circuitry configured to receive an audio input;
a DTMF decoder coupled to the communication circuitry that is configured to decode DTMF symbols included in the audio input received from the communication circuitry and configured to transfer the decoded DTMF symbols to a buffer to be stored;
a timer coupled to the DTMF decoder and the buffer;
a volume accumulator coupled to the communication circuitry and the timer and configured to determine whether the audio input includes audio with volume above a predetermined threshold and configured to reset the timer when the audio input includes audio with volume above the predetermined threshold;
the buffer configured to receive an instruction from the timer or the volume accumulator to transfer each stored DTMF symbol to a filter; and
the filter configured to identify a characteristic of information conveyed by the DTMF symbols and further configured to send the identified characteristic information to an output device.

2. The apparatus of claim 1, wherein the filter is further configured to identify a characteristic of the information conveyed by the DTMF symbols by matching the DTMF symbols to a pattern.

3. The apparatus of claim 2, wherein the pattern is selected from the group consisting of a telephone number format and a telephone routing information format.

4. The apparatus of claim 1, wherein the timer is configured to determine a time associated with when each DTMF symbol was received in the audio input and configured to transfer each associated time to the buffer to be stored, and wherein the buffer is further configured to transfer each associated time to a group boundary detector that is configured to receive the DTMF symbols and associated time from the buffer and determine a predetermined number of longest time durations in between certain of the DTMF symbols.

5. The apparatus of claim 4, wherein the group boundary detector is further configured to identify groups of DTMF symbols where the time duration between symbols in a group is less than a time duration between groups of symbols.

6. The apparatus of claim 4, wherein the predetermined number of longest time durations in between certain of the DTMF symbols is determined by a longest difference between an observed time duration and an expected time duration.

7. The apparatus of claim 4, wherein the group boundary detector is further configured to determine whether the predetermined number of longest time durations indicate a domestic or international telephone number format.

8. The apparatus of claim 1, wherein the timer is further configured to expire after a predetermined duration of time indicating silence included in the audio input.

9. The apparatus of claim 1, wherein audio with volume above the predetermined threshold indicates voice included in the audio input.

10. The apparatus of claim 1, wherein the output device is an electronic device with a memory for storage.

11. A method for identifying a characteristic of information conveyed by dual-tone multi-frequency (DTMF) symbols, the method comprising:
- receiving, by communication circuitry, an audio input;
- decoding, by a DTMF decoder coupled to the communication circuitry, each DTMF symbol included in the audio input received from the communication circuitry;
- transferring, by the DTMF decoder, the decoded DTMF symbols to a buffer to be stored;
- determining, by a volume accumulator coupled to the communication circuitry and a timer, whether the audio input includes audio with volume above a predetermined threshold;
- resetting, by the volume accumulator, the timer when the audio input includes audio with volume above the predetermined threshold;
- transferring, by the buffer, each stored DTMF symbol to a filter when instructed by the timer or the volume accumulator;
- identifying, by the filter, a characteristic of information conveyed by the DTMF symbols; and
- sending, by the filter, the identified characteristic information to an output device.

12. The method of claim 11, wherein the identifying comprises matching the DTMF symbols to a pattern.

13. The method of claim 12, wherein the pattern is selected from the group consisting of a telephone number format and a telephone routing information format.

14. The method of claim 11, wherein the timer is configured to determine a time associated with when each DTMF symbol was received in the audio input and configured to transfer each associated time to the buffer to be stored, and wherein the buffer is further configured to transfer each associated time to a group boundary detector that is configured to receive the DTMF symbols and associated time from the buffer and determine a predetermined number of longest time durations in between certain of the DTMF symbols.

15. The method of claim 14, wherein the group boundary detector is further configured to identify groups of DTMF symbols where the time duration between symbols in a group is less than a time duration between groups of symbols.

16. The method of claim 14, wherein the predetermined number of longest time durations in between certain of the DTMF symbols is determined by a longest difference between an observed time duration and an expected time duration.

17. The method of claim 14, wherein the group boundary detector is further configured to determine whether the predetermined number of longest time durations indicate a domestic or international telephone number format.

18. An apparatus configured to identify a characteristic of information conveyed by dual-tone multi-frequency (DTMF) symbols, the apparatus comprising:
- communication circuitry configured to receive an audio input;
- a programmed processor coupled to memory and configured to execute instructions stored in the memory;
- the programmed processor further configured to determine whether the audio input includes at least one DTMF symbol;
- if the audio input includes at least one DTMF symbol, the programmed processor further configured to store in the memory the at least one DTMF symbol;
- the programmed processor further configured to determine whether the audio input includes audio with volume above a predetermined threshold;
- if the audio input does not include audio with volume above the predetermined threshold, the programmed processor further configured to determine whether a timer expired;
- if the audio input includes audio with volume above the predetermined threshold or the timer expired, the programmed processor further configured to determine whether the stored at least one DTMF symbol indicates a format of a telephone number; and
- if the stored at least one DTMF symbol indicates the format of a telephone number, the communication circuitry further configured to send the stored at least one DTMF symbol to an output device.

19. The apparatus of claim 18, wherein the programmed processor is further configured to store in the memory a time associated with when the at least one DTMF symbol was received in the audio input and to determine a predetermined number of longest time durations in between certain of the stored at least one DTMF symbol.

20. The apparatus of claim 19, wherein the programmed processor is further configured to identify groups of DTMF symbols where the time duration between symbols in a group is less than a time duration between groups of symbols.

21. An apparatus configured to identify a characteristic of information conveyed by dual-tone multi-frequency (DTMF) symbols, the apparatus comprising:
- communication circuitry configured to receive an audio input;
- a DTMF decoder coupled to the communication circuitry that is configured to decode DTMF symbols included in the audio input received from the communication circuitry and configured to transfer the decoded DTMF symbols to a buffer to be stored;
- a timer coupled to the DTMF decoder and the buffer;
- a voice activity detector coupled to the communication circuitry and the timer and configured to determine whether the audio input includes voice information and configured to reset the timer when the audio input includes voice information for longer than a predetermined length of time;
- the buffer configured to receive an instruction from the timer or the voice detector to transfer each stored DTMF symbol to a filter; and
- the filter configured to match the DTMF symbols to a pattern and further configured to send the matched DTMF symbols to an output device.

* * * * *